US 6,178,982 B1

(12) United States Patent
Longstreth

(10) Patent No.: US 6,178,982 B1
(45) Date of Patent: Jan. 30, 2001

(54) SHUT-OFF VALVE FOR A SPRINKLER HEAD

(76) Inventor: John W. Longstreth, 6190 Silverfield, Las Vegas, NV (US) 89103-4523

( * ) Notice: Under 35 U.S.C. 154(b), the term of this patent shall be extended for 0 days.

(21) Appl. No.: 09/458,718

(22) Filed: Dec. 13, 1999

(51) Int. Cl.$^7$ .................................................. F16K 17/40
(52) U.S. Cl. .......................................... 137/68.14; 137/71
(58) Field of Search ............................... 137/68.14, 517, 137/71

(56) References Cited

U.S. PATENT DOCUMENTS

| 3,826,463 | * | 7/1974 | Beauregard | 251/120 |
| 3,976,141 | * | 8/1976 | Harrington | 169/90 |
| 4,848,661 | * | 7/1989 | Palmer et al. | 239/204 |
| 5,174,500 | * | 12/1992 | Yianilos | 137/68.14 |
| 5,351,708 | * | 10/1994 | Donato et al. | 137/68.1 |
| 5,372,306 | * | 12/1994 | Yianilos | 239/201 |
| 5,524,824 | * | 6/1996 | Frimmer | 239/71 |
| 5,758,682 | * | 6/1998 | Cain | 137/68.14 |
| 5,857,487 | * | 1/1999 | Carson et al. | 137/519 |

* cited by examiner

Primary Examiner—Gregory L. Huson
Assistant Examiner—Ramesh Krishnamurthy
(74) Attorney, Agent, or Firm—Norman B. Rainer

(57) ABSTRACT

A shut-off valve interactive between a sprinkler head and a riser pipe, and adapted to stop water flow in the event the sprinkler head is inadvertently broken off, includes a coupling sleeve suitably threaded to engage the sprinkler head and riser pipe, and having an annular frangible zone. A sealing member movably confined within the sleeve abuts the sprinkler head and is thereby held in a stand-by position which permits water flow. However, when the sprinkler head is broken off at the site of the frangible zone, water pressure forces the sealing member upwardly into abutment with an apertured washer, thereby stopping water flow.

2 Claims, 1 Drawing Sheet

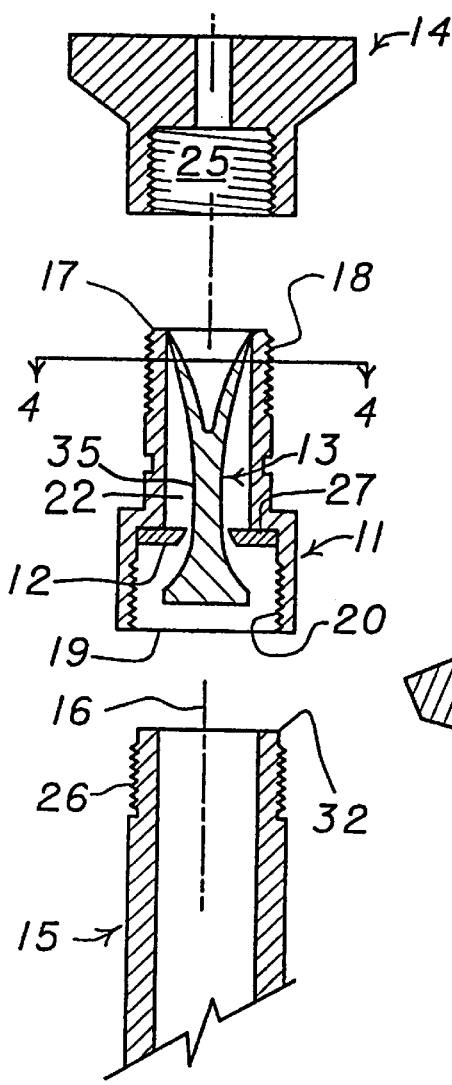
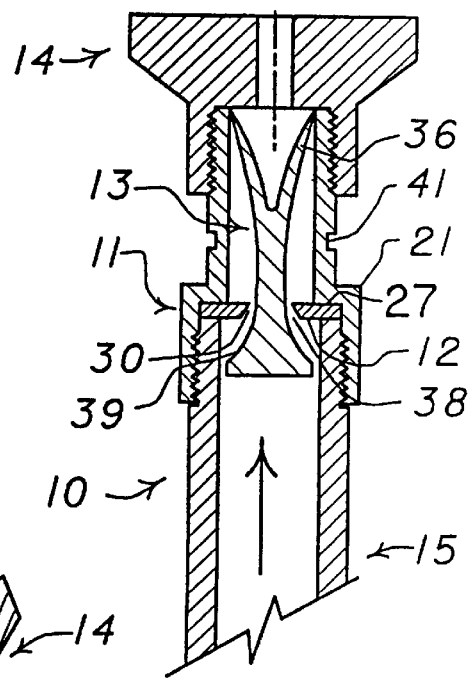
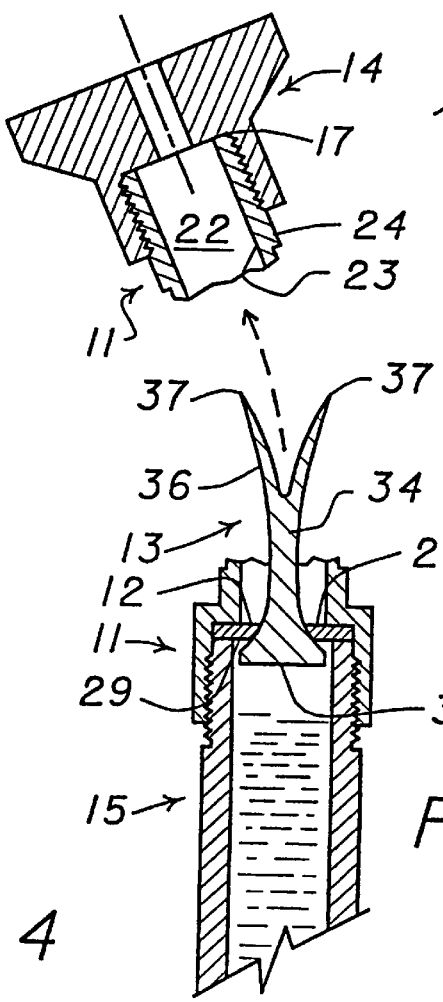
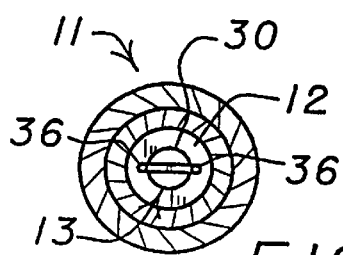
FIG. 1
FIG. 2
FIG. 3
FIG. 4

SHUT-OFF VALVE FOR A SPRINKLER HEAD

BACKGROUND OF THE INVENTION

1. Field of the Invention

The present invention relates generally to a shut-off valve for sprinkler systems and more particularly to a valve which shuts off the water flow through a sprinkler outlet when the sprinkler head has become dislodged.

2. Description of the Prior Art

In a typical sprinkler system such as employed, for example in a lawn, a single water source supplies water simultaneously to several sprinkler outlets, interconnected by a network of underground supply pipes. Generally, at each outlet, a vertical riser pipe extends upward from a T-fitting or elbow in the supply pipe to the surface, where it is capped by a sprinkler head.

When designing a sprinkler system to spread water over a specified area, the water pressure, water flow volume, and the number, placement and type of sprinkler heads must all be considered. If a sprinkler head becomes broken off as by lawn maintenance equipment or becomes otherwise dislodged, the system will generally not function properly. First, the water flow through that particular outlet will increase dramatically due to the reduced resistance. Second, this increased flow will not be dispersed, often causing localized flooding or erosion. Third, the water flow to the remaining outlets will be diminished, causing incomplete watering by the remainder of the circuit.

Therefore, it would be beneficial to have a mechanism which would shut off the water flow through an outlet from which the sprinkler head has Home dislodged. This would prevent the increased, undispersed flow through that particular outlet, as well as the decreased water flow through the remaining sprinklers.

Specific mechanisms have been designed to automatically shut off the flow of water through a sprinkler outlet in the absence of a sprinkler head. Generally, the existing mechanisms rely upon hydraulic pressure—the local increase in water flow due to the missing sprinkler head—to close a valve, thereby shutting off water flow through the outlet.

Such mechanisms, as disclosed for example in U.S. Pat. Nos. 3,976,141; 4,848,661; 5,372,306; 5,523,824; 5,758,682; and 5,857,487 are generally multi-component devices, and require specialized components and/or techniques for installation. The prior devices also do not clearly address the problem of protecting the sprinkler head and riser pipe from damage resulting from an impact that would sever the sprinkler head from the riser pipe.

It is accordingly an object of the present invention to provide a shut-off valve for a sprinkler head, said valve being installable without tools onto sprinkler heads and associated riser pipes of conventional design.

It is a further object of this invention to provide a shut-off valve as in the foregoing object having a durable and simple construction amenable to low cost manufacture.

It is a still further object of the present invention to provide a shut-off valve of the aforesaid nature which affords protection to an associated sprinkler head and riser pipe with respect to impact damage.

These objects and other objects and advantages of the invention will be apparent from the following description.

SUMMARY OF THE INVENTION

The above and other beneficial objects and advantages are accomplished in accordance with the present invention by a shut-off valve interactive between a sprinkler head having a downwardly directed female threaded opening and a riser pipe having a male threaded uppermost extremity adapted to engage said female threaded opening, said valve comprising:

a) a coupling sleeve having a hollow interior region and elongated upon a straight axis between an upper extremity having external male threading adapted to engage said sprinkler head and a lower extremity having interior female threading adapted to engage said riser pipe, and interior annular shoulder, and an annular frangible zone disposed between said shoulder and upper extremity, b) a washer disposed within said interior region and seated upon said shoulder, said washer having an aperture centered upon said axis, and c) a sealing member moveable upon said axis, and comprised of a head portion disposed below said washer, and shaft portion directed upwardly from said head portion, penetrating said aperture and terminating in an upper extremity adapted to abut against said sprinkler head, said head portion configured so as to occlude said aperture when said seating member moves upwardly.

BRIEF DESCRIPTION THE DRAWING

For a fuller understanding of the nature and objects of the invention, reference should be had to the following detailed description taken in connection with the accompanying drawing forming a part of this specification and in which said similar numerals of reference indicate corresponding parts in all the figures of the drawing:

FIG. 1 is an exploded sectional side view of an embodiment of the shut-off valve of the present invention.

FIG. 2 is a sectional side view as in FIG. 1 showing the shut-off valve assembled and in its stand-by state.

FIG. 3 is an exploded side view of the embodiment of FIG. 1 showing the shut-off valve in its shut-off state.

FIG. 4 is a sectional view taken in the direction of the arrows upon the line 4–4 of FIG. 1.

DESCRIPTION OF THE PREFERRED EMBODIMENT

Referring now to FIGS. 1–4, an embodiment of the shut-off valve 10 of the present invention is shown comprised of coupling sleeve 11, washer 12 and sealing member 13 insertively engaging said washer. The shut-off valve is interactive with a conventional sprinkler head 14 and conventional riser pipe 15.

Coupling sleeve 11 is elongated upon a straight center axis 16 between upper extremity 17 having external male threading 18 and lower extremity 19 having interior female threading 20. Coupling sleeve 11 may be further characterized as comprised of a rigid sidewall 21, preferably of monolithic construction, defining an interior region 22 and having interior and exterior circular cylindrical surface 23 and 24, respectively. Said male threading 18 is configured to engage the female threading 25 downwardly directed from said sprinkler head 14. Said female threading 20 is configured to engage the male threading 26 upwardly directed from riser pipe 15. Sidewall 21 is desirably fabricated of rigid polyvinyl chloride, and preferably has a thickness of between 2 and 5 millimeters.

An interior annular shoulder 27 is fashioned within sidewall 21. Washer 12, disposed within interior region 22, has upper and lower flat faces 28 and 29, respectively, and aperture 30 centered upon axis 16. Washer 12 is preferably fabricated of a resilient material such as a rubber or plasticized polyvinyl chloride having a Shore A Durometer hardness between 40 and 80. Aperture 30 is preferably of circular contour. The thickness of washer 12, measured between said upper and lower faces is preferably between 2 and 5 millimeters. In the installed position of the shut-off valve, upper face 28 fits flush against shoulder 27, and lower face 29 abuts against the squared-off upper extremity 32 of riser pipe 15.

Sealing member 13, moveable upon said axis between uppermost and lowermost positions, is comprised of head portion 33 disposed below washer 12, and a shaft portion 34 directed upwardly from said head portion and penetrating aperture 30 in said washer. The exemplified shaft portion is comprised of straight lower section 35 centered on axis 16, and a bifurcated upper section having upwardly and outwardly divergent arms 36 which terminate in coplanar abutment extremities 37 adapted to contact said sprinkler head. The diameter of lower section 35 is considerably smaller than the diameter of aperture 30, thereby producing an annular gap 38 between the washer and shaft sufficiently large to permit adequate water flow in the standby state of the shut-off valve, as shown in FIG. 2 wherein said sealing member is in its lowermost position. Head portion 33 is of larger diameter than aperture 30, whereby, when sealing member 13 is urged upwardly toward said sprinkler head, said head portion occludes aperture 30, thereby preventing flow of water through gap 38.

In the illustrated preferred embodiment, head portion 33 includes a sealing section 39 which is inwardly tapered toward said shaft portion, and aperture 30 is correspondingly tapered in order to mate with said sealing section. Sealing member 13 is fabricated of a resiliently rigid plastic which permits arms 36 to be squeezed together sufficiently to permit passage through aperture 30.

It is to be noted that sealing member 13 is held within washer 12 in a manner permitting axial movement of said sealing member. It is to be further noted that the construction of arms 36 is such as not to block passage of water into the sprinkler head, and said abutment extremities are located sufficiently apart to prevent passage through aperture 30 absent squeezing.

An annular frangible zone 41 is located in sidewall 21 between shoulder 27 and external male threading 18. In the illustrated embodiment, said frangible zone is a recess in the exterior surface 24 of said sidewall. The depth of said recess is sufficient to produce a site of controlled structural weakness, whereby any impact directed against the sprinkler head will cause breakage at said frangible zone without causing damage to either the sprinkler head or riser pipe.

In the active shut-off state of the shut off valve of this invention, as shown in FIG. 3, the hydrostatic pressure of water in the riser pipe forces head portion 33 against aperture 30, thereby preventing water flow through aperture 30 toward said sprinkler head. To restore and replace the shut-off valve, it is only necessary to utilize a new coupling sleeve 11. In some embodiments, a screen-type filter may be disposed upon shaft portion 34 of sleeve washer 12.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A shut-off valve interactive between a sprinkler head having a downwardly directed female threaded opening and a riser pipe having a male threaded uppermost extremity adapted to engage said female threaded opening, said valve comprising:

a) a coupling sleeve comprised of a rigid sidewall of monolithic construction bounded by interior and exterior circular cylindrical surfaces and defining a hollow interior region elongated upon a straight axis between an upper extremity having external male threading adapted to engage said sprinkler head and a lower extremity having interior female threading adapted to engage said riser pipe, an interior annular shoulder, and an annular frangible zone formed as a recess in said exterior surface between said shoulder and upper extremity, b) a washer fabricated of a resilient material having a Shore A Durometer hardness between 40 and 80, said washer disposed within said interior region seated upon said shoulder and having an aperture-centered upon said axis, and c) a sealing member moveable upon said axis between uppermost and lowermost positions, and comprised of a head portion disposed below said washer, and shaft portion directed upwardly from said head portion, penetrating said aperture and terminating in a bifurcated upper section having outwardly divergent arms biased into engagement with the interior cylindrical surface of the upper extermity of the coupling sleeve to hold the sealing member in place, said arms with abutment extremities adapted to contact said sprinkler head, said head portion having a sealing section inwardly tapered toward said shaft portion, said sealing member being fabricated of a resiliently rigid plastic which permits said arms to be squeezed together sufficiently to permit passage through said aperture.

2. The valve of claim 1 wherein the diameter of the shaft portion of said sealing member is considerably smaller than the diameter of said aperture, thereby defining an annular gap sufficiently large to permit adequate water flow when said sealing member is in its lowermost position.

* * * * *